United States Patent [19]

Shuler

[11] 4,217,122
[45] Aug. 12, 1980

[54] FILTER RETAINING LATCH

[75] Inventor: Bernard R. Shuler, Louisville, Ky.

[73] Assignee: American Air Filter Company, Inc., Louisville, Ky.

[21] Appl. No.: 956,492

[22] Filed: Nov. 1, 1978

[51] Int. Cl.² .................. B01D 46/10; E05D 7/00
[52] U.S. Cl. .................................... 55/480; 55/493; 55/504; 16/147
[58] Field of Search ............ 55/357, 422, 480, 493, 55/504, 505; 16/147; 210/232

[56] References Cited
U.S. PATENT DOCUMENTS

| 1,746,283 | 2/1930 | Reed et al. | 55/357 |
| 2,349,486 | 5/1944 | Crosman | 16/147 |
| 3,093,401 | 6/1963 | Hagendoorn | 55/493 |
| 3,393,498 | 7/1968 | Schoen | 55/493 |
| 3,815,342 | 6/1974 | Watts | 55/493 |
| 4,002,443 | 1/1977 | Lorenz | 55/357 |
| 4,021,212 | 5/1977 | Legler | 55/480 |
| 4,124,361 | 11/1978 | Revell | 55/493 |

FOREIGN PATENT DOCUMENTS 1915823 10/1969 Fed. Rep. of Germany ............ 16/147
939897 10/1963 United Kingdom ...................... 55/505

Primary Examiner—David L. Lacey
Attorney, Agent, or Firm—Jon C. Winger

[57] ABSTRACT

A latch assembly for removably clamping a unit filter cell in position against a flow-through frame structure includes a shaft spaced from the flow-through frame structure and mounted for rotational movement about its longitudinal axis and for movement transverse to its longitudinal axis toward and away from the flow-through filter frame. The shaft also includes filter cell contacting elements. The shaft is also biased toward the flow-through frame structure. A unit filter cell is disposed between the shaft and flow-through frame structure and is held in place against the frame structure upon rotation of the biased shaft which brings the filter cell contacting elements into contact with the unit filter cell.

8 Claims, 4 Drawing Figures

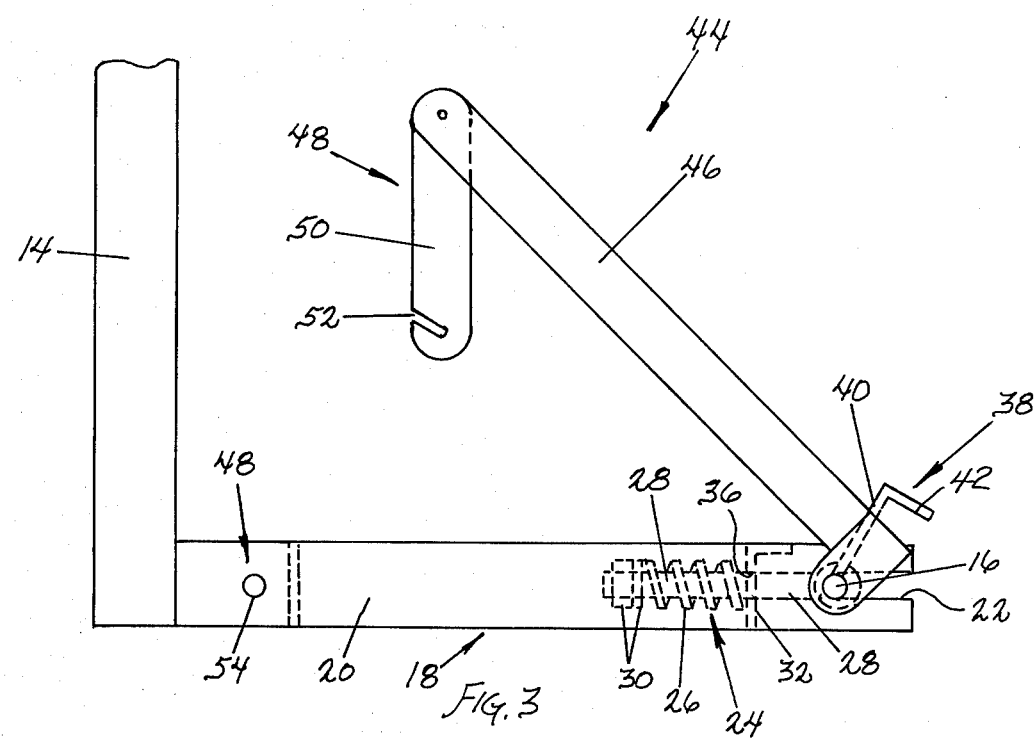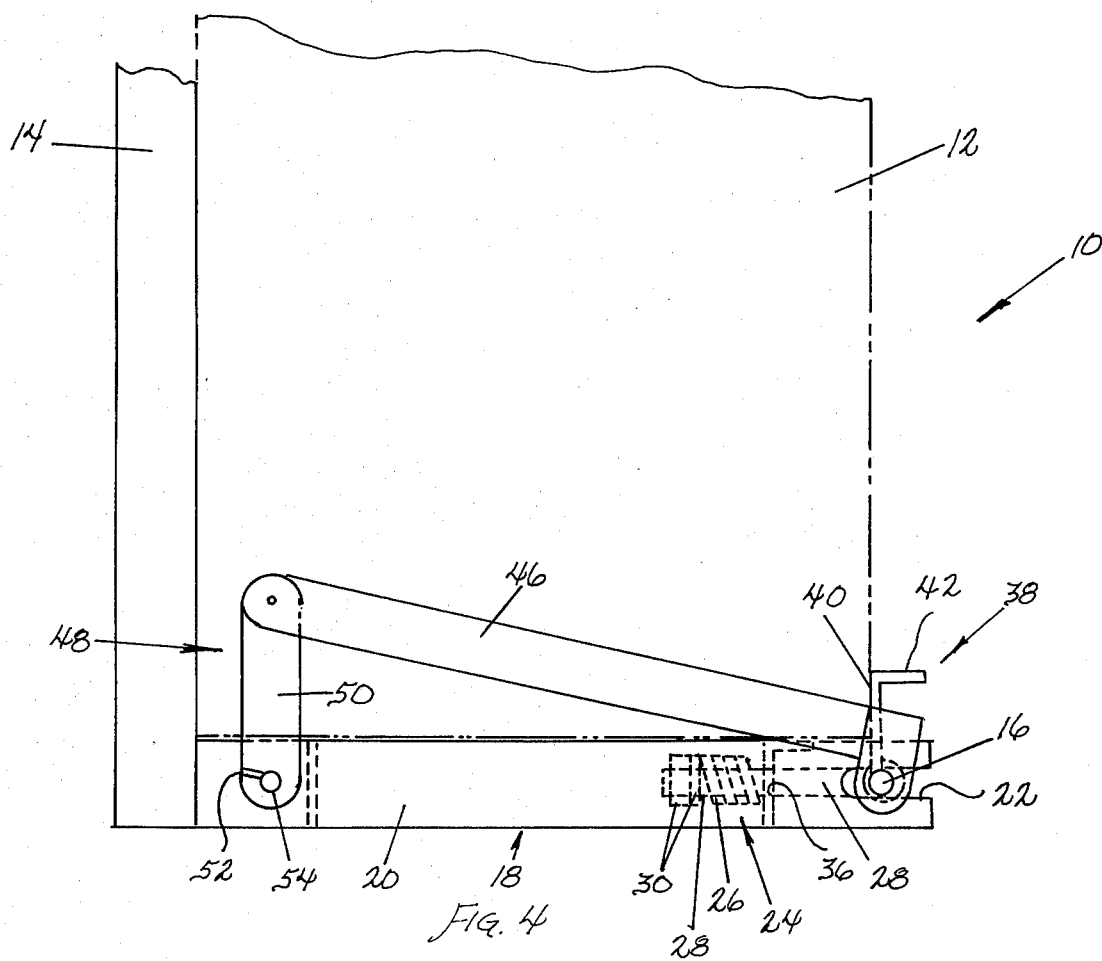

FILTER RETAINING LATCH

BACKGROUND OF THE INVENTION

The present invention pertains to means for securing or retaining a gas separating device to a suitable frame, and more particularly to a unit filter cell latch assembly having a hinged or pivoted retainer or clamp for holding the unit filter cell in the gas flow line.

Various unit filter cell retaining latch assemblies are known. Exemplary of these prior art devices are: U.S. Pat. No. 3,393,498 issued on July 23, 1968 to D. W. Schoen; U.S. Pat. No. 3,434,269 issued on Mar. 25, 1969 to P. L. Hyatt; U.S. Pat. No. 3,537,242 issued on Nov. 3, 1970 to R. L. Bennett; U.S. Pat. No. 3,593,503 issued on July 20, 1971 to Paul D. Andrews; U.S. Pat. No. 3,630,008 issued on Dec. 28, 1971 to Alan E. Revell; and, U.S. Pat. No. 3,816,984 issued on July 18, 1974 to Gerhard Max Neumann.

A unit filter cell latch used to clamp a unit filter cell in a frame structure should apply a substantially uniform clamping force against the unit filter cell. A non-uniform clamping force applied to the unit filter cell will prevent the unit filter cell from seating squarely against the frame structure and could exert a strain on the unit filter cell which could cause it to fracture or warp.

Further, in order to conserve space, and therefore cost, a unit filter cell latch should be compact in construction and capable of being actuated with a minimum of movement.

SUMMARY OF THE INVENTION

The present invention recognizes these desirable attributes and provides a latch assembly which not only satisfies them, but one which is also straightforward in construction and, therefore, relatively inexpensive to manufacture as well as maintain in good operating condition. An added plus of the present invention is that the clamping force exerted by the latch assembly can be easily and inexpensively changed.

More particularly, the present invention provides a latch assembly for removably clamping a unit filter cell in position against a flow-through frame structure to filter contaminants from a gas stream passing through the flow-through frame structure, the latch assembly comprising:

an axle spaced from the flow-through frame structure; means for mounting the axle for rotational movement about the longitudinal axis of the axle; means for rotating the axle about the longitudinal axes of the axle; means for mounting the axle for movement transverse to the longitudinal axes toward and away from the flow-through frame structure; biasing means for biasing the axle transverse to the longitudinal axes of the axle toward said flow-through frame structure; and, filter cell contacting means rigidly structurally associated with said axle for contacting the unit filter cell, which unit filter cell is to be disposed between the axle and flow-through frame structure, when the axle is rotated in one direction the axle to move transversely of the longitudinal axis of the axle against the force of the biasing means thus forcing the unit filter cell against the flow-through frame structure, and for disengaging from the unit filter cell when the axle is rotated in the other direction allowing the biasing means to move the axle transversely of the longitudinal axis of the axle toward the flow-through frame structure thus relieving the force against the unit filter cell.

BRIEF DESCRIPTION OF THE DRAWINGS

A better understanding of the present invention will be had upon reference to the accompanying specification and by reference to the following drawings wherein like numerals refer to like parts throughout the several views, and in which.

FIG. 3 is an enlarged side view taken in the direction of arrows 3—3 in FIG. 1; and, FIG. 4 is an enlarged side view similar to that of FIG. 3 but illustrating a unit filter cell held in position against the flow-through frame structure by the latch assembly.

DETAILED DESCRIPTION OF THE PREFERRED EMBODIMENT

Figure 1:
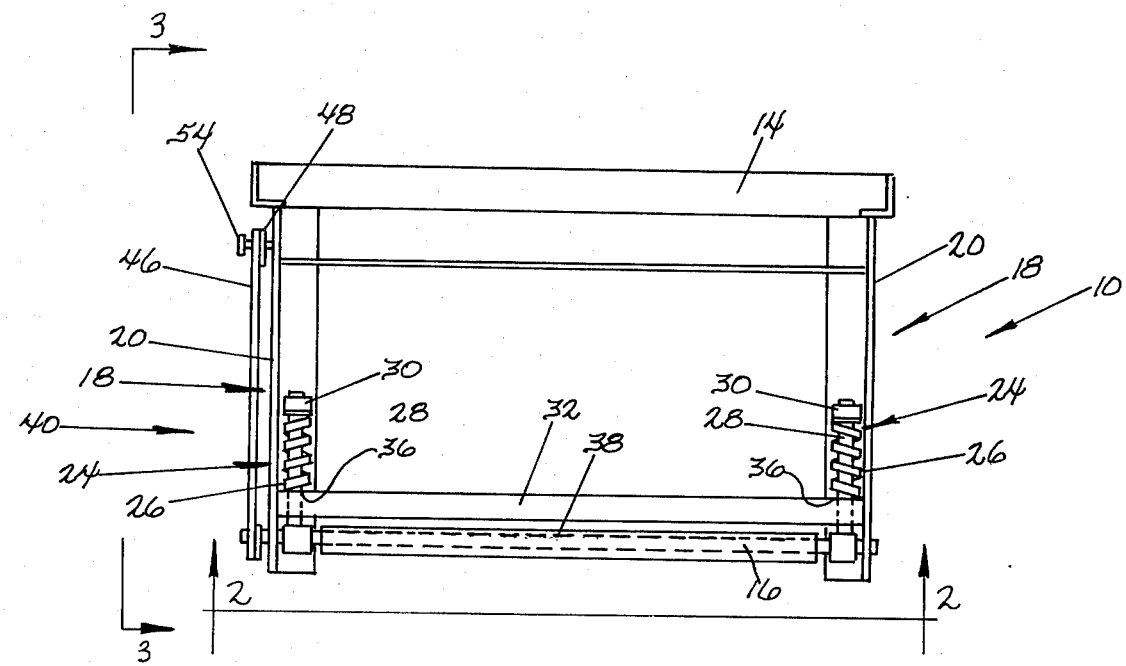
FIG. 1 is a top view of a latch assembly of the present invention and a flow-through filter frame structure.
Figure 2:
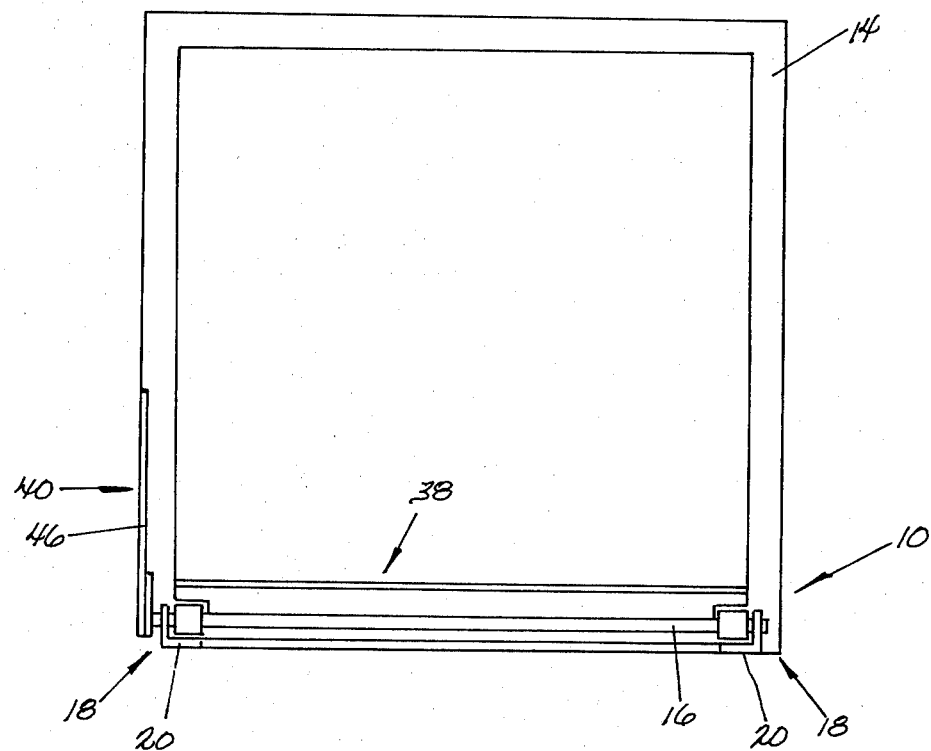
FIG. 2 is an end view taken in the direction of arrows 2—2 in FIG. 1.

With reference to FIGS. 1-4, there is shown a latch assembly, generally denoted as the numeral 10, for removably clamping a unit filter cell 12 (see FIG. 4) against a flow-through frame structure 14. The flow-through frame structure defines a passage for the stream of gas to be cleaned, and the unit filter cell 12 is held in the stream of the gas to be cleaned by the latch assembly 10 to separate contaminants from the stream of gas as it passes through it.

The latch assembly 10 comprises an axle 16 spaced from the flow-through frame structure 14 with its longitudinal axis generally parallel to the plane of the flow-through frame structure, i.e., normal to the stream of gas to be cleaned. An axle carriage structure, generally denoted as the numeral 18, is disposed adjacent the flow-through frame structure 14. The axle carriage structure 18 is illustrated as being formed of two spaced apart generally parallel elongated members 20, each attached at one of its ends to the flow-through frame structure 14 and having an elongated aperture 22 formed proximate its other end with the major axis of the elongated aperture 22 lying in the longitudinal direction of the elongated member 20. Each end of the axle 16 is received in a different one of the elongated apertures 22 so that the axle 16 can rotate in the apertures 22 about the longitudinal axis of the axle 16 and also move along the major axis of the elongated apertures 22 in a direction transverse to the longitudinal axis of the axle 16 toward and away from the flow-through frame structure 14. Biasing means generally denoted as the numeral 24, bias the axle 16 transverse to the longitudinal axis of the axle 16 toward the flow-through filter frame 14. The biasing means is shown as comprising at least one, but preferably two coil-type compression springs 26 disposed to exert a force on the axle transverse to the longitudinal axis of the axle toward the flow-through frame structure 14. Each coil spring 26 is held in position by a spring guide pin 128 which is coaxially received through the coil spring 26. Each spring guide pin 28 is journaled at one of its ends to the axle 16. The coil spring 26 is captured between spring keeper means 30, such as a bolt and washer, attached to the end of the spring guide-pin 28 opposite the end thereof which is journaled to the axle 16 and spring retainer means 32 which is disposed between the ends of the spring guide pin 28. The spring retainer means 32 is illustrated as a bar which is disposed between the axle 16 and flow-through frame structure 14, parallel to the axle 16 and extending between and connected at its opposite ends to the spaced apart elongated members 20 of the axle carriage structure 18. The bar 32 has two spaced apart holes 36 transverse to its longitudinal axis. Each hole 36 slidably receives a different one of the spring guide pins 28. Each coil spring 26 is positioned coaxially over a spring guide pin 28 with one end in abutment with the bolt and washer of the spring keeper means 30 and the other end in abutment with the bar 32 comprising the spring retainer means.

Filter cell contacting means, generally denoted as the numeral 38, is rigidly structurally associated with the axle 16 for selectively contacting the unit filter cell 12 upon rotation of the axle 16. The filter cell contacting means 38 can be formed of a length of angle iron disposed lengthwise along the axle 16 and attached at one of its legs 40 to the axle 16. The other leg 42 of the length of angle iron projects transversely outwardly from the axle 16 and reinforces the leg 40 which will contact the unit filter cell 12.

Means generally denoted as the numeral 44, for selectively rotating the axle about the longitudinal axis of the axle 16 is illustrated as comprising a lever arm 46 fixedly attached at one of its ends to the axle 16. The other or free end of the lever arm 46 is adapted to be grasped by a hand for manually moving the lever arm 46 through an arcuate path thus causing the axle 16 to rotate about its longitudinal axis. The lever arm 46 also has means generally denoted as the numeral 48, for selectively locking the axle 16 against rotation about the longitudinal axis of the axle. The axle locking means 48 comprises a link member 50 pivotally attached at one of its ends to the free end of the lever arm 46. The other or free end of the link member 50 is formed with an open ended slot 52. A pin member 54 is attached to and projects from one of the elongated members 20 of the axle carriage structure 18 and is adapted to be received in the slot 52 formed in the link member 50. When the pin member 54 is received in the slot 52 the lever arm 46 is locked in position and the axle 16 can not rotate.

In operation, the unit filter cell 12 is disposed in juxtaposition to the flow-through filter frame structure 14 between the axle 16 and the flow-through filter frame structure (see FIG. 4). The lever arm 46 is moved in an arcuate path from its position shown in FIG. 3 generally toward the elongated members 20 to a filter clamping position shown in FIG. 4. The arcuate movement of the lever arm 46 causes the axle 16 to rotate about its longitudinal axis and moves the filter cell contacting flange 40 of the filter cell contacting means 38 into contact with the unit filter cell 12. As the filter cell contacting flange 40 makes contact with the unit filter cell 12, the axle 16 moves transversely of its longitudinal axis against the biasing force of the coil springs 26 for the reason that the distance between the filter cell contacting means 38 is less than the depth of the unit filter cell 12. Thus, the filter cell contacting flange 40, through the biasing force of the cell springs 26, forces the unit filter cell 12 into sealing engagement against the flow-through frame structure 14. When the unit filter cell 12 is in position against the flow-through frame structure the axle is locked against rotation by engaging the pin member 54 into the open ended slot 52 in the link member 50.

To remove the unit filter cell 12, the abovediscussed process is reversed. First, the pin member 54 is disengaged from the open slot 52 in the link member 50 and the lever arm 46 is moved in an arcuate path from its position shown in FIG. 4 generally away from the elongated members 20 to the position shown in FIG. 3. The arcuate movement of the lever arm 46 causes the axle 16 to rotate in a like rotational direction about its longitudinal axis and moves the filter cell contacting flange 40 of the filter cell contacting means 38 away from and out of contact with the unit filter cell 12. Thus, the force generated by the coil spring 26 through the unit filter cell 12 contacting means 38 forcing the unit filter cell 12 against the flow-through frame structure is relieved allowing the unit filter cell to be removed. Incidentally, the biasing force of the coil springs 26 then moves the axle 16 in a transverse direction toward the flow-through frame structure 14.

The biasing force exerted against the unit filter cell 12 can be easily changed to suit various unit filter cell constructions or other conditions by merely substituting coil springs having a greater or lesser spring modulus.

The foregoing detailed description is given primarily for clarity of understanding and no unnecessary limitations should be understood therefrom for modifications will be obvious to those skilled in the art upon reading this disclosure and may be made without departing from the spirit of the invention or the scope of the appended claims.

What is claimed is:

1. A latch assembly for removably clamping a unit filter cell in position against a flow-through frame structure, said latch assembly comprising:
an axle to be spaced from said flow-through frame structure by a distance less than the depth of said unit filter cell, said unit filter cell to be disposed in said space;
an axle carriage structure to be disposed adjacent said flow-through frame structure;
said axle carriage structure having elongated apertures for receiving said axle, the longitudinal axes of said elongated apertures being transversely disposed to the longitudinal axes of said axle, and said axle being received in said elongated apertures with an adequate clearance to allow said axle to rotate about the longitudinal axes of said axle and to move transversely of the longitudinal axes of said axle along the longitudinal axes of said elongated apertures toward and away from said flow-through frame structure;
unit filter cell contacting means rigidly structurally associated with said axle for contacting said unit filter cell when said unit filter cell is disposed in said space between said flow-through frame structure and said axle upon rotation of said axle in one direction and for disengaging from said unit filter cell when said axle is rotated in the opposite direction; and,
means for biasing said axle in a direction transverse to the longitudinal axes of said axle toward said flow-through frame structure in said elongated slots such that upon rotation of said axle causing said contacting means to contact said unit filter cell said axle is caused to move transversely of its longitudinal axis along said elongated apertures away from said flow-through frame structure against the force of said biasing means, thus, causing said biasing means acting through said filter unit contacting means to exert a force on said unit filter cell in a direction toward said flow-through frame structure and further comprising means for selectively locking said axle against rotation about the longitudinal axis of said axle when said filter contacting means is in contact with said unit filter cell forcing said unit filter cell against said flow through frame structure 2. The latch assembly of claim 1, wherein said biasing means comprises at least one spring disposed to exert a force on said axle transverse to the longitudinal axis of said axle toward said flow-through frame structure.

3. The latch assembly of claim 2, wherein said biasing means further comprises:
- at least one spring guide pin journaled at one of its ends to said axle;
- spring keeper means attached to the end of said at least one spring guide pin opposite the end thereof which is journaled to said axle;
- spring retainer means disposed between the ends of said at least one spring guide pin; and,
- said at least one spring being a coil spring disposed generally coaxially over said at least one spring guide pin and in compression between said spring keeper means and said spring retainer means such that said at least one spring coacts with said spring keeper means to exert a force on said at least one spring guide pin in an axial direction of said at least one spring guide pin.

4. The latch assembly of claim 1, wherein said axle carriage structure comprises:
- two spaced apart members, each member being formed with one of said elongated apertures;
- said elongated apertures being in alignment with each other; and,
- each end of said axle being received in a different one of said elongated apertures.

5. The latch assembly of claim 4, wherein said spring retainer means comprises:
- a bar disposed between said axle and said flow-through frame structure and extending between and connected to said spaced apart members of said axle carriage structure; and,
- said bar having a hole formed therein for slidably receiving said at least one spring guide pin.

6. The latch assembly of claim 1, wherein said means for rotating said axle comprises:
- a lever arm attached at one of its ends to said axle for manually rotating said axle in one direction about the longitudinal axis of said axle to move said filter cell contacting means into contact with said unit filter cell and to move said axle in the other direction about the longitudinal axis of said axle to disengage said filter cell contacting means from said unit filter cell.

7. The latch assembly of claim 6, wherein said means for selectively locking said axle comprises:
- a link member pivotally attached at one of its ends to the free end of said lever arm, and formed with a slot open at one end proximate its other end; and,
- a pin member attached to said axle carriage structure and adapted to be received into said slot formed in said link member, thus, preventing unwanted movement of said lever arm and consequently locking said axle against rotation about the longitudinal axis of said axle.

8. The latch assembly of claim 1, wherein said filter cell contacting means comprises at least one flange adapted to contact said unit filter cell.

* * * * *